US006494015B1

(12) United States Patent
Critchlow

(10) Patent No.: US 6,494,015 B1
(45) Date of Patent: Dec. 17, 2002

(54) DECK BUILDING TOOL METHOD AND APPARATUS

(76) Inventor: Bill S. Critchlow, 1110 No. Bel-Air Dr., Mt. Vernon, WA (US) 98273

( * ) Notice: Subject to any disclaimer, the term of this patent is extended or adjusted under 35 U.S.C. 154(b) by 0 days.

(21) Appl. No.: 09/627,356

(22) Filed: Jul. 28, 2000

Related U.S. Application Data

(60) Provisional application No. 60/146,220, filed on Jul. 28, 1999.

(51) Int. Cl.[7] .................................................. G01B 3/00

(52) U.S. Cl. .................... 52/749.1; 52/DIG. 1; 52/105; 33/481; 269/1

(58) Field of Search ................................ 52/749.1, 105, 52/127.2, DIG. 1; 33/480, 481, 403; 269/1

(56) References Cited

U.S. PATENT DOCUMENTS 4,280,282 A * 7/1981 Wright ........................ 33/427
4,285,139 A * 8/1981 Huston ........................ 33/407
4,506,481 A * 3/1985 Witschi et al. ............. 52/127.2
4,573,276 A * 3/1986 Torczon ........................ 33/481
4,773,163 A * 9/1988 Wolford, Jr. ................. 33/479
4,776,250 A * 10/1988 Julius .......................... 83/745
5,170,568 A * 12/1992 Wright ........................ 33/480
5,491,905 A * 2/1996 Jablonski et al. ............. 33/613
5,546,670 A * 8/1996 Chiang ........................ 33/640
5,813,126 A * 9/1998 Dahl ........................... 33/474
6,018,880 A * 2/2000 Wiggins ....................... 33/474
6,088,977 A * 7/2000 Lawrence .................... 52/182

* cited by examiner

*Primary Examiner*—Carl D. Friedman
*Assistant Examiner*—Jennifer I. Thissell
(74) *Attorney, Agent, or Firm*—Robert B. Hughes; Hughes Law Firm PLLC

(57) ABSTRACT

A tool used to install pickets on the railing of a deck. The railing of a deck comprises two horizontal support members and a plurality of pickets. The device has a rearward surface that is adapted to engage a picket or support post. There are two indicating locations on the tool that correspond to the correct location of a second picket to be installed. Indicating marks are made on a horizontal support member and the second picket is placed in between the indicating marks and attached thereto.

7 Claims, 6 Drawing Sheets

DECK BUILDING TOOL METHOD AND APPARATUS

This application claim the benefit of provisional application No. 60/146,220, filed Jul. 28, 1999.

FIELD OF THE INVENTION

The present invention relates to a method and apparatus to assist in building decks, and more particularly to the installation of vertical members that must be evenly spaced and substantially parallel to each other. The present invention is particularly advantageous for the installation of pickets that are a component of a railing for a deck.

BACKGROUND

Wooden decks are often provided for homes and they are generally level and somewhat elevated from the ground. Surrounding the deck is a railing to prevent a person from accidentally falling off a deck. The railing generally comprises an upper rail support, a lower rail support and pickets. The pickets are positioned vertically between the upper rail and the lower rail. There must be a minimal horizontal distance between adjacent vertical surfaces of the pickets in order to comply with local building codes; however, the pickets should not any closer to each other than necessary.

The proper positioning of these pickets is a somewhat time consuming task that must be accomplished reliably. For example if one of the pickets is out of alignment then the pickets that are placed in a position parallel to the misaligned picket repeat the mistake along the length of the railing.

SUMMARY OF THE INVENTION

The present invention provides a tool that is simple in design, inexpensive to manufacture and easy to use for assisting in building decks. The tool is used to create indicating marks on a horizontal beam. These marks are then used to position vertical members between the header and footer horizontal beams.

The tool comprises a frame member and a flange. In a preferred embodiment, the frame member is trapezoidal in shape and has a front end and a rear end. The flange is positioned at the rear end of the frame member and in a plane substantially perpendicular to the frame member. The frame member further comprises a lower portion and an upper portion. A base edge is located at the lower portion of the frame member. The base edge is perpendicular to the plane which the flange is located in. A first and second indicator locations are located on the base edge that are each positioned at a predetermined location from the rearward surface of the flange. The perpendicular distance from the first location to the rearward surface of the flange is denoted as 'a'. The perpendicular distance from the second indicator location to the rearward surface of the flange is denoted as 'b'.

In a preferred embodiment, the tool further comprises and open portion located in the central area of the frame. The central area defines a third indicator that is positioned at a perpendicular distance 'a' from the base edge. The upper portion of the frame defines an upper edge that is parallel to the base edge. The perpendicular distance from the upper edge to the base edge is 'b'. Further in the open portion a level can be located. This level can indicate whether the base edge is vertical or the flange is horizontal.

The environment the tool is designed to operate is in deck construction. A deck railing is used to help prevent people and movable objects from falling off the deck. Pickets must be placed in the deck railing at a specific distance to comply with building codes and to maintain a safe deck. When constructing a railing there is an upper rail support and a lower rail support. The upper rail support comprises two upper support beams and a horizontal cap. The lower rail support comprises two lower support members. The pickets are horizontally spaced between the two upper support beams and the two lower support beams.

During construction of the railing, the pickets are positioned perpendicular to one of the upper support beams and one of the lower support beams and then are nailed to each beam. To horizontally space the next picket, the tool is positioned so the rearward surface of the flange is in contact with a fixed picket and the base edge is in contact with one of the beams. The worker then creates two marks on the beam so the location of these marks correspond to the location of the two indicators on the base edge. These two marks are used to position the next picket.

An alternative method of marking the next picket is to hang the tool by the forward surface of the flange so the tool's base edge is in contact with the previously positioned picket. Then the worker can make a mark on the upper beam at the third indicator position and another mark along the upper edge. Then a new picket can be positioned in-between these two marks.

The leveling device can be used to ensure the pickets are vertical or the railing is horizontal. Also, the width of the frame member can be used to separate the deck planks.

BACKGROUND ART

The usual method of positioning pickets has been to use a tape measure determine the horizontal spacing between the pickets. A search of the prior art Patent literature has disclosed a number of patents directed toward the positioning of various members in wood structures or the like, and these are the following:

In U.S. Pat. No. 4,237,614 is an adjustable locator for furring strips. The present invention has no such similar construction and has a different functionality. The adjustable locator has a flange with an inturned portion and a channel shaped member to engage furring strips. This embodiment is not designed to create indicating marks on a horizontal beam but rather its design is for grasping actual firing strips. Further the invention in the '614 patent requires calibration and an assembly of several pieces.

In U.S. Pat. No. 3,201,874 is a self-spacing stud guide that has two jaws to engage studs. This invention is also designed to hold studs and not simply mark the locations where they are to be located. The embodiment in the '874 requires two instruments to function; each holding two studs in position.

In U.S. Pat. No. 4,958,814 is an interval locator similar to the '873 patent. This invention also operates on a somewhat different principal where the interval locator holds the building components in place and then they are fixed in place. Further this device lacks functional elements of the present invention.

In U.S. Pat. No. 5,031,886 shows a framing aid that comprises a template where studs are positioned in a template and nailed to top and bottom plates. The template is single piece member that that is molded to hold studs and a top or bottom plate. This patent utilizes a completely different technique of assembling vertical members.

Finally the U.S. Pat. No. 5,490,334 show a tool that is used to position a stud to a footer or header. The tool utilizes a cradle that snugly fits a loose stud. The tool then positions the stud a set distance from a fixed stud and the loose stud is then nailed to the header or footer. This invention is used to install a loose stud to a fixed stud and is not designed to make measurement marks on the header or footer.

DETAILED DESCRIPTION OF THE PREFERRED EMBODIMENT

Throughout this description reference is made to top and bottom, front and rear. The device of the present invention can, and will in practice, be in numerous positions and orientations. These orientation terms, such as top and bottom, are obviously used for aiding the description and are not meant to limit the invention to any specific orientation.

Figure 10:
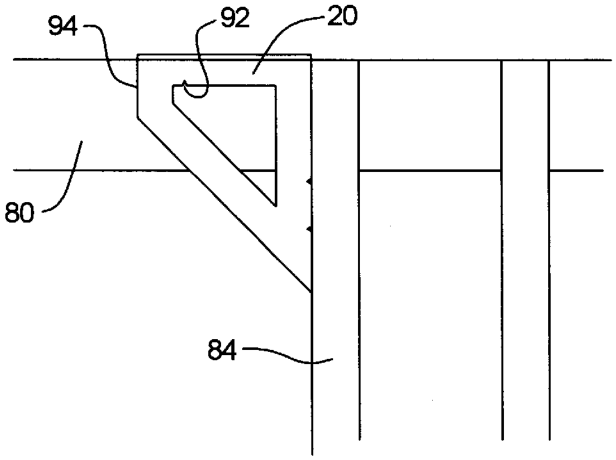
FIG. 10 is a cross sectional view of a completed upper railing.

As seen in FIG. 1, the tool 20 comprises a unitary structure 21 which comprises a frame member 22 and the flange 24. For the sake of clarity and accuracy of description, a coordinate system 26 is defined where there is the vertical axis 28, the lengthwise or longitudinal axis 30 and the transverse axis 32. The transverse direction is defined to as traveling in the direction indicated as 32 or 32'. Although in actual use the tool 20 can be easily rotated, the vertical axis 28 will still denote a direction extending from origin point 36 to the upper portion 38 regardless of the tool's orientation (e.g. where the tool is in the position shown in FIG. 10 the vertical axis runs from right to left).

The frame member 22 comprises an upper portion 38, a lower portion 40, a forward portion 42 and a rear portion 44. The frame member 22 is positioned substantially to occupy an alignment plane defined by the vertical and longitudinal axis, and in the preferred form the frame 22 is a planar member. The frame member has a width 23 dimension in the transverse direction. Located in the upper portion 38 is an upper edge surface 39 that at least partially lies in an upper surface plane 41 that is defined by the longitudinal axis 30 and the transverse axis 32.

Figure 1A:
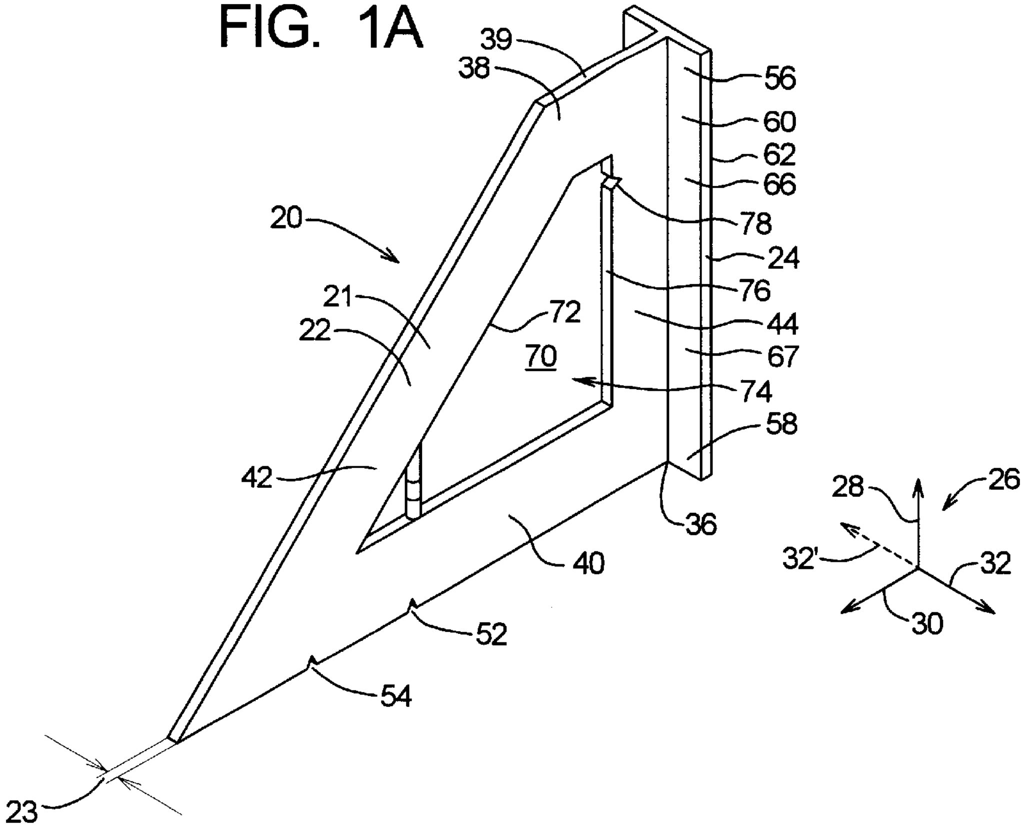
FIG. 1*a* shows an isometric view of the tool taken from an upper and forward perspective.
Figure 1B:
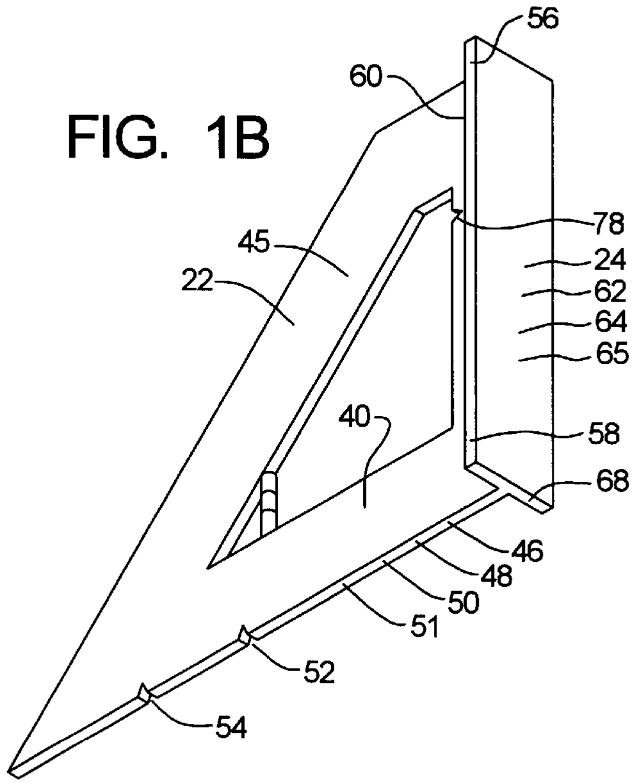
FIG. 1*b* is a view similar to FIG. 1*a* but taken from a rearward and lower perspective.

As best seen in FIG. 1*b*, located at the lower portion 40 of the frame member 22 is a base portion 46. The base portion 46 comprises a base edge 48, a base edge surface 50, a first indicator 52 and a second indicator 54. The base edge surface 50 at least partially lies in the base surface plane 51, which is defined by the longitudinal and transverse axis. The first and second indicators 52 and 54 can be a notch that is formed from the base edge surface 50, the indicator can be any indicating means (indentation or line in the frame surface 45, etc.) that can be used to accurately measure a distance from the flange 24.

As seen in FIGS. 1*a* and 1*b* located in the rear portion 44 of the frame 22 is the flange 24. The flange 24 is planar and substantially lies in the plane that is defined by the vertical and transverse axes (28 and 31 in FIG. 1*a*). The flange 24 has an upper portion 56 and a lower portion 58. Further, the flange 24 has a forward surface portion 60 and a rear surface portion 62. The rear surface portion 62 of flange 24 has a rear contact surface 64 (see FIG. 1*b*), and located at the forward surface portion 60 is a forward contact surface 66 (see FIG. 1*a*). The rear contact surface 64 substantially lies in a rear contact plane 65 that is defined by the vertical axis 28 and transverse axis 32. Likewise, the forward contact surface 66 substantially lies in a forward contact plane 67 that also is defined by the vertical axis 28 and transverse axis 32. Located in the lower portion 58 of the flange 24 is an abutment surface 68 which is in the same plane as base edge surface 50.

Figure 3A:
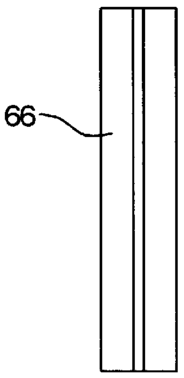
FIG. 3*a* is a front view of the tool.
Figure 3B:
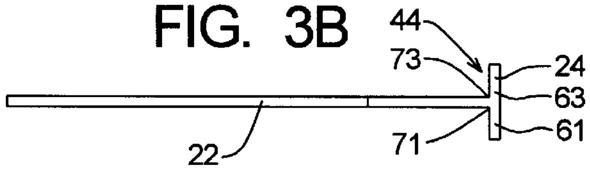
FIG. 3*b* is a top view of the tool.

FIG. 3*b* shows a top view of the tool 20 where the flange 23 of the rear portion 44 has a first flange portion 61 and a second flange portion 63. The first flange portion 61 is connected to the frame member 22 at a first juncture area 71 and the second flange portion 63 is connected to the frame member 22 by a second juncture area 73.

It is desirable for the frame member 22 to have an open middle area 70 defined by an inner perimeter edge 72 and located in the central portion 74 of the frame member 22. In the rear portion 44 there is a vertical inner edge 76 that is part of the inner perimeter edge that that runs parallel to the vertical axis 28. A third indicator 78 is positioned on this inner edge 76. The third indicator 78 is similar to the first and second indicators 52 and 54 and is used to measure a distance from the base surface plane 51. The indicator can be a notch, line or other device in order to mark a surface adjacent to the frame member 22.

Figure 2:
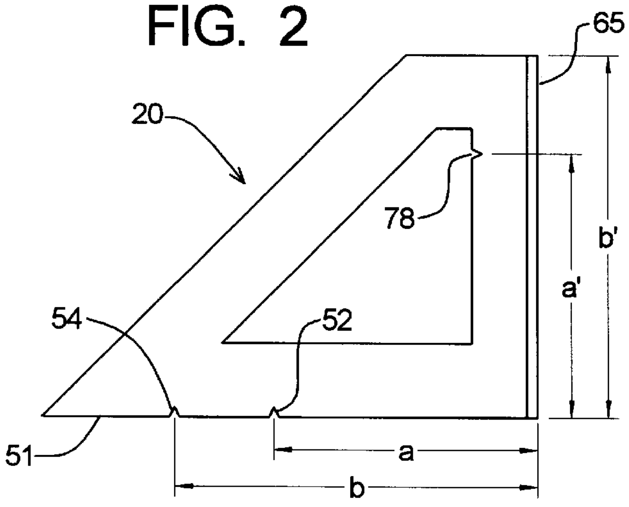
FIG. 2 is a side view of the tool.

As seen in FIG. 2, the distance from the rear contact plane 65 and the first indicator 52 is indicated as 'a'. The distance from the rear contact plane 65 and the second indicator 54 is denoted as 'b'. The distance 'a' is the desired distance between two pickets. The distance 'b' represents the distance of the desired space between two pickets plus the horizontal width of a picket.

In a similar manner, the distance 'a'' is the perpendicular distance from the base surface plane 51 and the third indicator 78.

The distance 'b'' is the perpendicular distance between upper surface plane 41 and the base surface plane 51. The distance 'a'' is the same as distance 'a' which represents the distance gap between two pickets. The distance 'b'' is the same as the distance 'b' which is the distance gap between two pickets plus the horizontal width of a picket. As will become apparent from the description later herein, this enables the functions of the present invention to be accomplished more easily.

Figure 4:
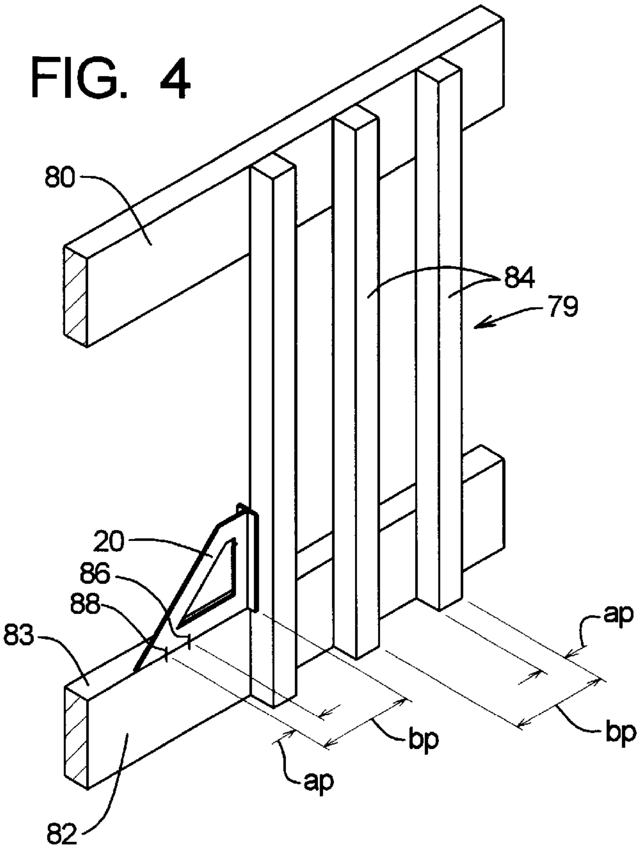
FIG. 4 is an isometric view of the tool in one operating position in an environment which in this embodiment is the construction of a wood a deck railing.
Figure 5:
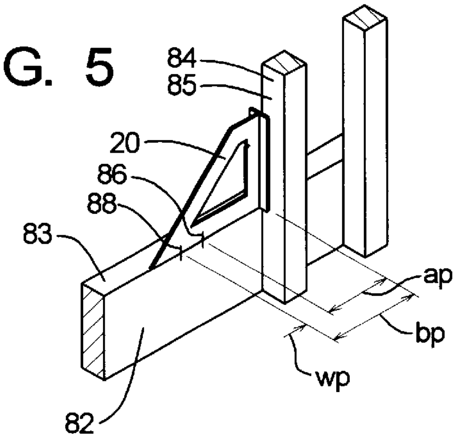
FIG. 5 is a close up isometric view of the tool in its operating position as in FIG. 4, where the tool is located on the lower support beam of the deck railing.

One operating environment for the tool 20 is shown in FIGS. 4–10. In a first mode of operation as seen in FIGS. 4 and 5, there is a deck railing 79 in the process of being built. At this stage in construction vertical posts are in place and the deck railing 79 comprises an upper support beam 80, a lower support beam 82 and some pickets 84. The beams 80 and 82 are attached to vertical posts. The pickets 84 are vertically positioned between the beams 80 and 82. The pickets 84 must be horizontally spaced from each other so that the distance gap '$a_p$' is distance that complies with building regulations or maintains a safe deck (e.g. two–five inches).

When the tool is positioned as seen in FIGS. 4 and 5, the rear contact surface 64 of the flange 24 is in contact with the forward picket surface 85 of picket 84. The flange 24 extends in the transverse direction so the rear contact surface 64 is in contact with the forward picket surface 85 while the base edge surface 50 of frame member 22 is in contact with the upper surface 83 of the lower support beam 82. Next the worker will make indicating marks 86 and 88 on the lower support beam 82. These marks can be created by a scratch, pencil mark or any method of marking a location on the lower support beam 82. The indicating mark 86 is positioned to correspond to the distance '$a_p$' and the indicating mark 88 is positioned to correspond to the distance '$b_p$'. The tool can now be removed and a new picket can be placed in-between the indicating marks 86 and 88.

Figure 6:
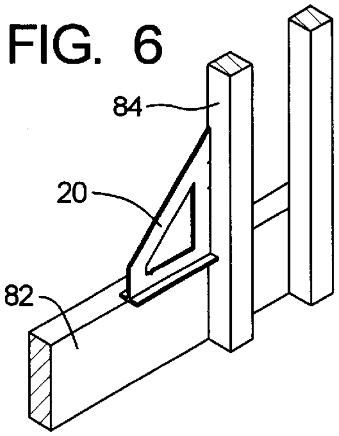
FIG. 6 is another isometric view of the tool where the tool is positioned in a different manner than in FIG. 4 or 5.

With reference to FIG. 6, the worker can rotate the tool 20 ninety degrees clockwise about the transverse axis from the position in FIG. 4 and 5 and further rotate the tool one-hundred and eighty degrees about the vertical axis to position the tool 20 as shown in FIG. 6. This positioning of the tool 20 is useful for the worker to ensure that the picket is perpendicular to the lower support beam 82 and ensures that that the picket is vertical (assuming that the lower support beam is already level). The flange 24 enables the tool to be positioned on the top surface 83 of the lower rail 82, with the base edge surface 50 being in contact with the picket 84. Alternatively the worker can use the level 55 of the frame member 22 to ensure the picket is vertical.

To position the upper ends of the pickets 84, the procedure that is illustrated in FIGS. 7–10 is utilized. While one of the many benefits of this present invention is that it can be used very conveniently to position both the upper and lower ends of the pickets 84, it should be recognized that the method shown in FIGS. 7–10 can be used independently or in conjunction with the aforementioned method shown in FIGS. 4–6. The method consists of hanging the tool 20 from the upper support beam 80. This hanging is accomplished by placing the forward contact surface 66 of the flange 24 in contact with the upper beam surface 90 of the support beam 80, so that the base edge surface 50 of frame member 22 is in contact with the forward picket surface 85 of picket 84. Next the worker creates indicating marks 92 and 94. These marks can be created in a similar manner to the marks 86 and 88. The indicating mark 92 represents a location that is a distance '$a_p$' from the forward picket surface 85. The indicating mark 94 represents a location that is a distance '$b_p$' from the forward picket surface 85. After the worker creates these marks he can remove the tool 20 and position the upper end of the picket being installed in between the marks 92 and 94 on the upper support beam 80 and secure the new picket 84 thereon. The securing process can include nailing gluing or any effective means of securing the picket to the upper support beam 80. This process could be used in a similar manner to install the picket 84 in the lower support beam 82. Having the upper edge surface 39 a perpendicular distance '$b_p$' from the base edge surface 51 is particularly advantageous for creating the indicating mark 94. The worker can easily position a pencil or other marking object along the upper edge surface 39 of the frame member 22 to create the indicating mark 94.

Figure 7:
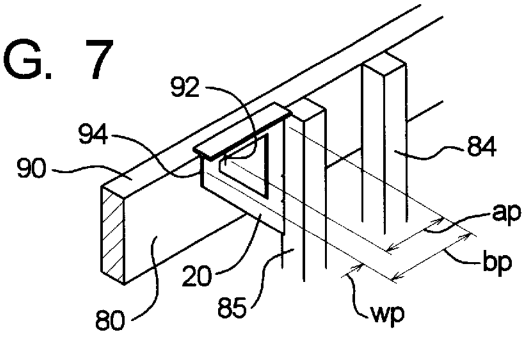
FIG. 7 is an isometric view of the tool where the tool is positioned in another operating position on the upper support beam of the railing.
Figure 8:
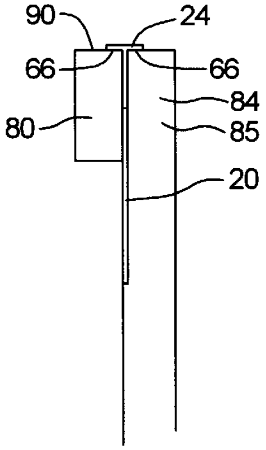
FIG. 8 is a side view of the tool located on the upper support beam as in FIG. 7.
Figure 9:
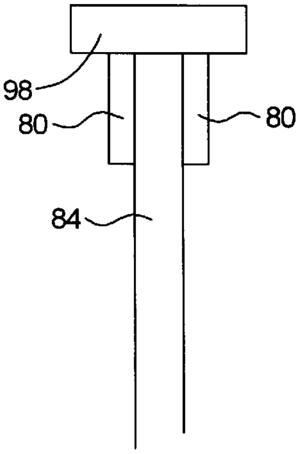
FIG. 9 is a front cross sectional view of the upper portion of a railing with the tool located thereon as in FIGS. 7 and 8.

FIG. 8 shows a cross-sectional view with the tool 20 with the tool 20 in the operating position of FIG. 7. The final assembly of the upper rail support 96 requires attaching another upper support beam 80 to the pickets 84 and then attaching a horizontal cap 98 above the upper support beams 80. The horizontal cap 98 can be a 2×6 piece of wood and the support beams 82 and 80 can be 1×6's.

The procedures shown in FIGS. 4–6 and in FIGS. 7–10 can advantageously be used together in positioning each picket where indicating marks 86 and 88 can be made on the lower support beam 82, and the indicating marks 92 and 94 being made on the upper support beam 80. A new picket can be positioned between these sets of marks and nailed to the support beams.

A further method of installing pickets is where the rear contact plane 65 of the tool 20 could be aligned with the indicating mark 88 so the mark lies in the contact plane 65. Then worker could create two more marks 86 and 88 on the lower support beam 82 at the position of the first and second indicators 52 and 54 of tool 20. This process can be repeated along the length of the lower support beam 82 prior to installing the pickets. A similar method can be accomplished on the where the base surface plane 51 would be aligned with indicating mark 94 on the upper support beam 80 so the indicating mark 94 lies in the plane of the base surface plane 51. Then the worker could create a first and second marks 92 and 94 on the upper support beam 80 that correspond to the location of the third indicator 78 and the upper surface plane 41 of the tool 20. The worker would then use the second mark to align the base surface plane of the tool 20 to repeat the measuring and marking process. This method of hanging the tool 20 could similarly be used on the lower support beam as well.

Figure 11:
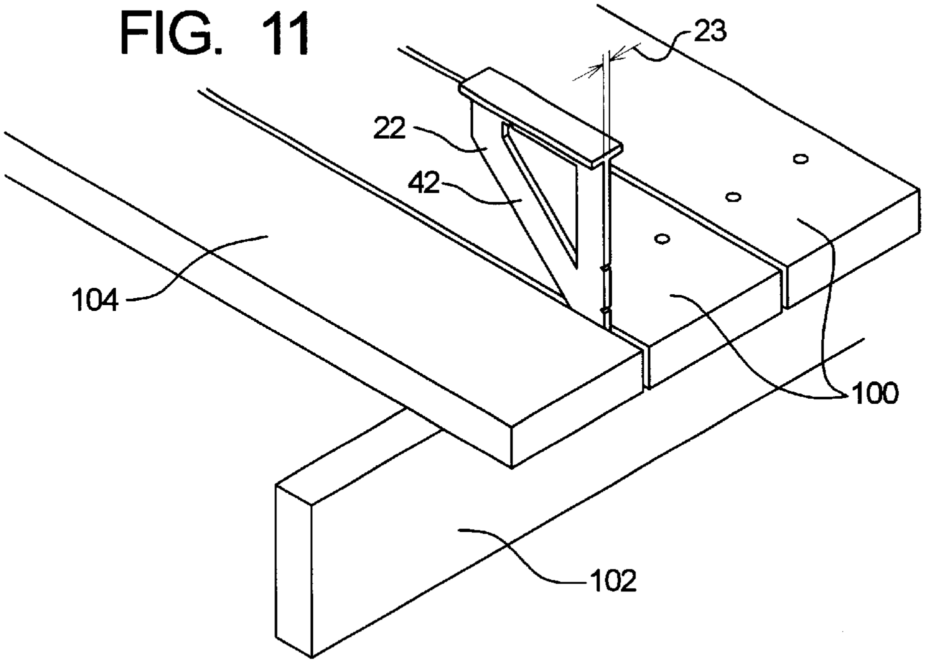
FIG. 11 is an oblique view of the tool being used to space deck planks.

Another use of the tool 20 is illustrated in FIG. 11. The width 23 of the frame member 22 is desirable equal to the spacing distance between deck planks 100. These planks 100 are attached to a support beam 102 and must be evenly positioned from each other a relatively small distance (e.g. ⅛ of an inch). A new plank 104 is positioned next to an attached plank 100. Next the forward portion 42 of tool 20 is inserted in-between the planks 100 and 104. Finally the new plank 104 is nailed or otherwise attached to the support beam 102.

Figure 12:
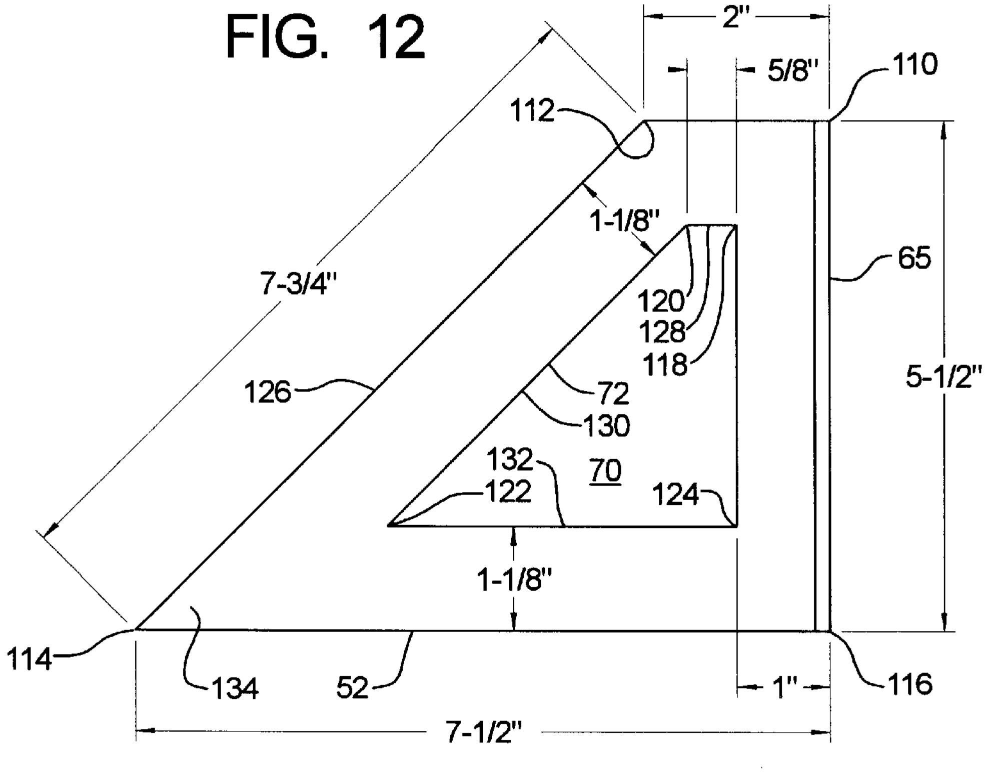
FIG. 12 is another side view of the tool similar to FIG. 2. This figure shows sample dimensions of the tool.
Figure 13:
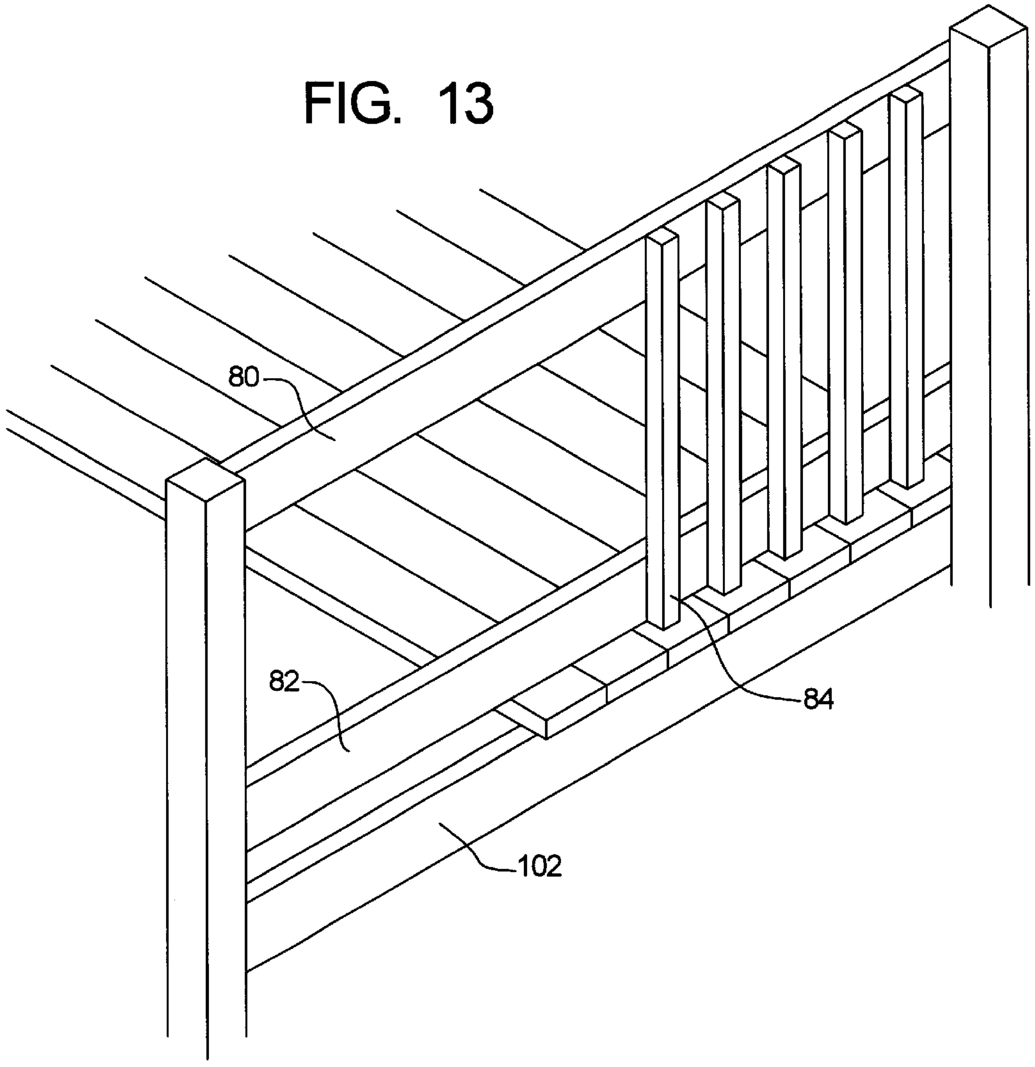
FIG. 13 shows the environment where the tool is used.

FIG. 12 shows some possible dimensions of the tool 20 and it further shows a few more points of interest. The tool 20 has outer corners 110, 112, 114 and 116 and there are inner corners 118, 120, 122 and 124. Inner edge 72 further comprises front inner edge 130 and lower inner edge 132. Front edge 126 is positioned in the front portion of the tool 20.

It should be noted that the open middle area 70 allows the worker to more easily grip the tool 20 thereby making any portion of the inner edge 72 a handle to come in contact with the workers fingers or palm.

Figure 14:
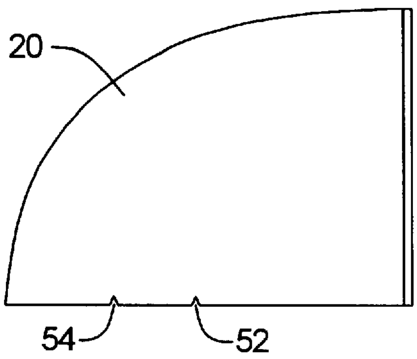
FIGS. 14–16 shows alternative functional shapes of the frame member.
Figure 15:
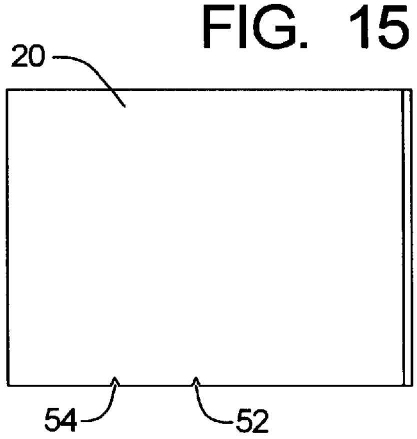
Figure 16:
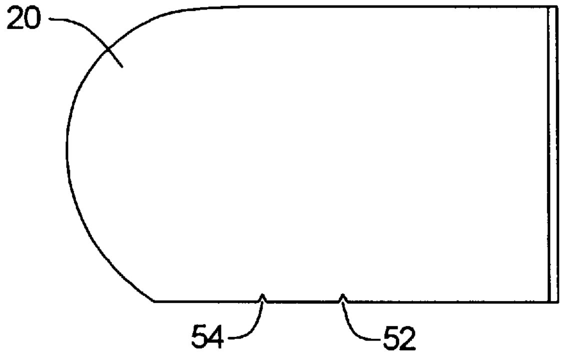

The frame member could be constructed in a variety of shapes although the frame member is particularly advantageous in a trapezoidal shape for purposes of having the forward point 134 to be used to separate deck planks 102. Other functional designs are shown in FIG. 14. The flange 24 is shown extending in positive and negative transverse directions from the frame member 22. The flange could be constructed to only extend in the positive transverse direction or in the negative transverse direction. Although this could only allow the tool to hang from on side of the frame 22.

Figure 17:
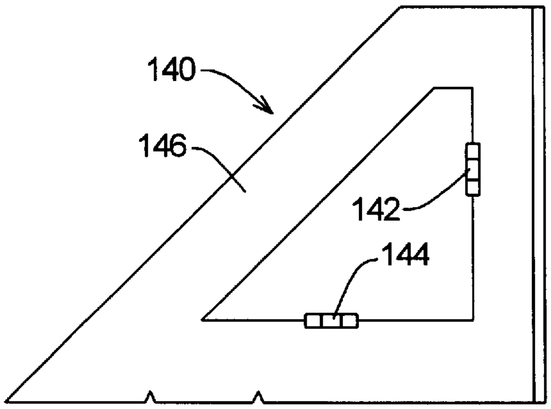
FIG. 17 shows a second embodiment of the present invention where the level portion is repositioned in the base portion of the apparatus.

FIG. 17 shows a second embodiment of the present invention where the apparatus 140 as a first level 142 positioned in the rearward portion. Further, a second level 144 is positioned in an orthogonal relationship to first level 142. The first and second levels 142 and 144 had a width that is proximate to the width of the frame portion 146. This allows the front open surface of the frame 146 to be flush against a flat surface. Of course additional levels at desirable angles (e.g. thirty, forty-five, sixty degrees) could be employed.

While the invention is susceptible of various modifications and alternative forms, specific embodiments thereof have been shown by way of example in the drawings and will herein be described in detail. It s should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. A tool for positioning pickets at spaced picket locations between upper and lower horizontal rail members in constructing a railing having a lengthwise axis where the pickets are vertically positioned at said spaced picket locations along the lengthwise axis of the railing with adjacent pickets having a predetermined spacing distance with a predetermined gap distance between facing surfaces of adjacent pickets, and each picket has a width dimension, said tool comprising:

a) a frame member having a vertical axis, a longitudinal axis, and a transverse axis, and having an alignment plane occupied by said vertical and longitudinal axes, said frame member comprising:
   i. a base portion having a front base portion and a rear base portion, and having a base contact surface that extends longitudinally along said alignment plane;
   ii. a rear frame portion that extends vertically in said alignment plane;

b) a positioning flange that is connected to said rear frame portion and has a rear contact surface that extends vertically along said rear frame portion and extends transversely from said rear frame portion to occupy a rear contact plane that is perpendicular to said alignment plane and perpendicular to said base contact surface;

c) at least one location indicator positioned longitudinally forwardly from said rear contact surface at an indicating location in a manner that, with the tool in an operating position with the flange member in operating engagement with an in-place picket at a spaced picket location, and with the base contact surface in engagement with one of the horizontal rail members, the indicating location is positioned to enable a locating mark to be made on said one of said beams corresponding to the indicating location of the locating indicator to indicate a picket-related location on the beam d) said tool further comprising a level indicator mounted to said tool, with said level indicator being oriented to at least one of said longitudinal and vertical axes.

2. A method of positioning pickets at spaced picket locations between upper and lower horizontal rail members in constructing a railing having a lengthwise axis where the pickets are vertically positioned at spaced picket locations along the lengthwise axis of the horizontal rail members with adjacent pickets having a predetermined spacing distance with a predetermined gap distance "a" between facing surfaces of adjacent pickets, and each picket having a width dimension "w", said method comprising:

a) providing a positioning tool comprising a frame member having a vertical axis, a longitudinal axis, and a transverse axis, and having an alignment plane occupied by the vertical and longitudinal axes, said frame member further comprising a base portion having a front base portion and a rear base portion and having a base contact surface that extends longitudinally along the alignment plane, said frame member further comprising a rear frame portion that extends vertically in the alignment plane, said tool further comprising a positioning flange that is connected to the rear frame portion and has a rear contact surface that extends vertically along said frame portion and transversely from said frame portion to occupy a rear contact plane that is perpendicular to the alignment plane and perpendicular to the base contact surface;

b) positioning a first picket in a first in-place picket location between said upper and lower horizontal rail members;

c) positioning said tool in an operating position where the flange is positioned with its contact surface engaging the first picket and with the base contact surface being positioned against or adjacent to the lower horizontal rail member;

d) positioning a marking instrument adjacent to a location indicator that is positioned longitudinally along the base contact surface at an indicating location which indicates location of a second picket to be placed at a correct spacing distance from said first picket, and marking said lower horizontal rail member with an indicating mark on the lower horizontal rail member identifying a picket location for the second picket;

e) positioning a lower end portion of a picket in an in-place position at the picket location at the lower horizontal rail member and vertically aligning said picket by placing one of the contact surfaces of the tool against a vertical surface of the picket with the other contact surface of the picket being in engagement with the lower horizontal rail member and using the tool as a reference guide vertically aligning the second picket.

3. The method as recited in claim 2, wherein the flange is positioned against a horizontal surface of one of said rail members, and the base contact surface is positioned vertically against the picket to accomplish proper vertical alignment of the picket.

4. The method as recited in claim 2, wherein there are two location indicators positioned along the longitudinal axis of the tool at the base portion of the frame, spaced from one another by a width dimension of the picket, and located at first and second indicating locations corresponding to edge portions of the picket in its in-place position, said method comprising marking said first and second locations on the adjacent rail member.

5. The method as recited in claim 2, wherein the flange has two aligned flange portions extending oppositely from one another on opposite sides of the rear frame portion, said method further comprising placing a vertically aligned, forwardly facing contact surface of the flange in a position where the forwardly facing contact surface of the flange is engaging at least one of the horizontal rail members so that the tool is positioned so that the vertical axis of the tool is longitudinally aligned, the method further providing a location indicator corresponding to the location of the picket on the rear portion of the frame and marking an upper horizontal member with a picket location mark, and positioning an upper end portion of the picket in accordance with the location of the mark on the upper horizontal member.

6. The method as recited in claim 5, wherein the tool has at the rear frame portion an upper edge surface which is spaced by the base contact surface by a distance which is equal to a distance "b" which is equal to the gap distance "a" plus the width dimension "w" of the picket, and marking a location on the upper horizontal member corresponding to the location of the upper edge surface of the rear frame portion.

7. The method as recited in claim 2, wherein there is provided on the tool a level indicator, and said level indicator is used by orienting at least an edge or contact surface of the tool in alignment with the picket, and ascertaining vertical alignment of the picket by means of observing said level indicator.

* * * * *